(12) United States Patent
Rybak et al.

(10) Patent No.: US 8,131,753 B2
(45) Date of Patent: Mar. 6, 2012

(54) APPARATUS AND METHOD FOR ACCESSING AND INDEXING DYNAMIC WEB PAGES

(76) Inventors: Ilya Rybak, Li-On (IL); Lior Harsat, Kfar-Saba (IL); Yael Schuldenfrei, Ramat-Gan (IL); Sagi Kariv, Tel-Aviv (IL)

(*) Notice: Subject to any disclaimer, the term of this patent is extended or adjusted under 35 U.S.C. 154(b) by 926 days.

(21) Appl. No.: 12/122,696

(22) Filed: May 18, 2008

(65) Prior Publication Data
US 2009/0288099 A1    Nov. 19, 2009

(51) Int. Cl.
G06F 7/00   (2006.01)
G06F 17/30  (2006.01)

(52) U.S. Cl. ........................................................ 707/770
(58) Field of Classification Search ......................... None
See application file for complete search history.

(56) References Cited

U.S. PATENT DOCUMENTS
2003/0191737 A1* 10/2003 Steele et al. ................... 707/1

OTHER PUBLICATIONS

Silva et al, "Searching Dynamic Web Pages with Semi-Structured Contents", EUNIS 03, European University Information Systems 2003, 8 pages.*
http://www.sitemaps.org/protocol.php#urlsetdef from http://www.sitemaps.org, printed Nov. 7, 2011, 12 pages.
http://www.infosecwriters.com/text_resources/pdf/Crawling_AJAX_SShah.pdf, 18 pages.

* cited by examiner

Primary Examiner — Uyen T. Le

(57) ABSTRACT

A method and apparatus for enabling an external application such as a web crawler access to dynamic web pages associated with a primary application such as a portal page. The primary application addresses each component associated with it and requests a list of resource identifiers. Each component implements an interface and provides such list of resource identifiers. The list is returned to the external application, which then optionally requests the contents of the page associated with each resource identifier. The component provides the content of the page, which is then parsed by a parsing module associated with the primary application. The parsing module transforms the content into a data structure such as a Document Object Model, and then extracts text or Hypertext Markup Language code from the data structure. The text is then returned to the external application fro searching, indexing or other purposes.

17 Claims, 4 Drawing Sheets

APPARATUS AND METHOD FOR ACCESSING AND INDEXING DYNAMIC WEB PAGES

TECHNICAL FIELD

The present disclosure relates to web crawlers in general, and to a method and apparatus for a web crawler to crawl through and index dynamic web pages, in particular.

BACKGROUND

A web crawler (also referred to as a web spider, a web robot or a web scutter) is a program or automated script which attempts to browse the World Wide Web in a methodical, automated manner. Web crawlers are often used for indexing the pages, for purposes such as updating a database of a search engine. Other purposes may include automating maintenance tasks on a website, such as checking links or validating Hypertext Markup Language (HTML) code.

A web crawler typically starts with a hard coded or otherwise obtained list of resource identifiers such as Uniform Resource Identifiers (URIs) or Uniform Resource Locators (URLs), the list initially called the seeds. Upon visiting each URI, the crawler identifies all hyperlinks in the page indicated by the URI and adds them to the initial list of URIs to visit. The added URIs are then visited according to a set of policies, and the process continues recursively. Within each visited page, the text or HTML content of the page is discovered and optionally further processed, for example parsed and indexed.

However, there are scenarios that restrict or disallow the access and activity of a web crawler. One such scenario is the existence of dynamic web pages, to which no link exists. This situation may occur, for example, when a user presses a "Submit" button after filling in a form, or in Web 2.0 applications which create links by executing scripts or other programming units such as JavaScript, or other situations in which URIs are created on-the-fly.

Further, the content of such pages, but also of other pages accessible by a regular link e.g., a hyperlink, may not always be pure text or HTML, but can rather contain non-HTML content, such as JavaScript, Flex, or Silverlight code embedded in the HTML, or any other technology that creates non-HTML content. Web crawlers are thus unable to parse, identify and make use of the content of such web pages.

These situations of dynamically constructed web pages is common for example in portal applications which usually rely on dynamic content rendering. Such content might be unreachable for typical web crawlers because navigation from one portal page to another is not realized through hyperlinks but rather comes as a result of execution of an application's internal logic. For example, such application can be used for enabling department members to view user information of all other department members. The application can be required to expose the user information to internal search engines so that these pages can later be searched. However, the links to such pages, as well as the contents of each such page are constructed dynamically and can thus not be reached and indexes by a web crawler.

There is thus a need for a method and apparatus for enabling a web crawler to reach dynamic web pages, and to index the contents of such web pages.

SUMMARY

A method and apparatus for enabling an external application such as a web crawler access to dynamic web pages associated with a primary application such as a portal page. The primary application addresses each component associated a with it and requests a list of resource identifiers. Each component implements an interface and provides a list of resource identifiers. The list is returned to the external application, which then optionally requests the contents of the page associated with each resource identifier. The component provides the content of the page, which is then parsed by a parsing module associated with the primary application. The parsing module transforms the content into a data structure such as a Document Object Model, and then extracts text or Hypertext Markup Language code from the data structure. The text is then returned to the external application fro searching, indexing or other purposes.

In one embodiment of the disclosure there is thus provided a method for providing to a first application communicating with a primary application, the text or Hypertext Markup Language code content of a dynamic web page, the dynamic web page created by a component associated with the primary application, the method comprising the steps of: the primary application sending to the component a request for a collection of resources; and the component providing to the primary application the collection of resource identifiers comprising a resource identifier associated with the dynamic web page. The method optionally comprises the steps of: the primary application requesting the content associated with the resource identifier from the component; the component rendering the content; and a parsing module associated with the primary application extracting text or Hypertext Markup Language code from the content. The method optionally comprises the steps of: the primary application receiving from the first application a request for the collection of resources; and the primary application sending to the first application the collection of resources. The method optionally comprises the steps of: the primary application receiving from the first application a request for content associated with a resource from the resource list, the resource associated with the dynamic web page; and the primary application sending to the first application the text or Hypertext Markup Language code. Within the method, the first application can be a web crawler and the primary application can be a portal page. Within the method, extracting the text or Hypertext Markup Language code optionally comprises the steps of: transforming the content into a data structure; and extracting the text or Hypertext Markup Language code from the data structure. Within the method, the data structure is optionally a Document Object Model object. Within the method, the dynamic web page optionally comprises JavaScript code.

Another aspect of the disclosure relates to an apparatus for providing to a first application communicating with the apparatus text or Hypertext Markup Language code content of a dynamic web page, the apparatus comprising: a primary application accessed by the first application, the primary application comprising or in communication with: one or more components, each component comprising a resource list interface implementation module implementing an interface for providing one or more resource identifiers; a component-addressing and collection module for addressing the components and collecting the resource identifiers provided by each component; and a parsing module for extracting text or Hypertext Markup Language code from content of the dynamic web page as received from the component in response to sending the resource identifiers. Within the method, the first application is optionally a web crawler, and the primary application is optionally a portal page. Within the method, the dynamic web page optionally comprises JavaScript code. Within the method, the parsing module optionally transforms the content of the dynamic web page as received from the component into a data structure and extracts the text or Hypertext Markup Language code from the data structure. Within the method, the data structure is optionally a Document Object Model object.

Yet another aspect of the disclosure relates to a computer readable storage medium containing a set of instructions for a general purpose computer, the set of instructions comprising a primary application sending to a component thereof a request for a collection of resources; and the component providing to the primary application the collection of resource identifiers comprising a resource identifier associated with a dynamic web page.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION

In several embodiments of the disclosure, a web page such as a portal page is accessed by a web crawler seeking to access and index all pages accessible from the web page. In accordance with one implementation, each application, such as a portal application is responsible for implementing an interface through which the application is to supply a list of all resource identifiers such as URIs accessible through the application. For example, in a portal page comprising an application for requesting details about a department member, the application implements an interface through which it supplies an updated list of all the relevant URIs, each of which produces an information page relating to a department member. The application is aware of its information sources, such as a database table comprising all department members, and can thus generate a list of the relevant web pages URIs. When a web crawler accesses the web page comprising the applications, each application being a part of the page is accessed through the interface and supplies the list of relevant URIs. The URIs from the list are returned to the crawler similarly to ordinary hyperlinks the crawler encountered while visiting the original web page, and are added to the list of pages to be visited by the web crawler.

On a second stage, the crawler, having received a web page URI, is attempting to obtain for example for indexing purposes, the contents of each such page, comprising text and HTML, as well as non-HTML content, such as JavaScript code optionally embedded within the HTML. On receiving a new URI, the crawler follows the link which results in a new HTTP request being sent to the application, or any framework responsible for managing the application, such as JavaServer Faces (JSF), Spring MVC, or others. As part of the request cycle, the page content is rendered by the application that provided the URI, the content typically comprising text, HTML and JavaScript or another dynamic content. Before the rendered markup is returned to the crawler, the response is parsed by a service associated with the portal or the wrapping application framework, such as a server side portal service. The parsing is similar to the way the page is parsed by a browser on the client side, and a Document Object Model (DOM) object is produced by the service. The text is then extracted from the DOM object comprising the complete searchable text using the DOM API. The text is then sent to the crawler for indexing the page.

Figure 1:
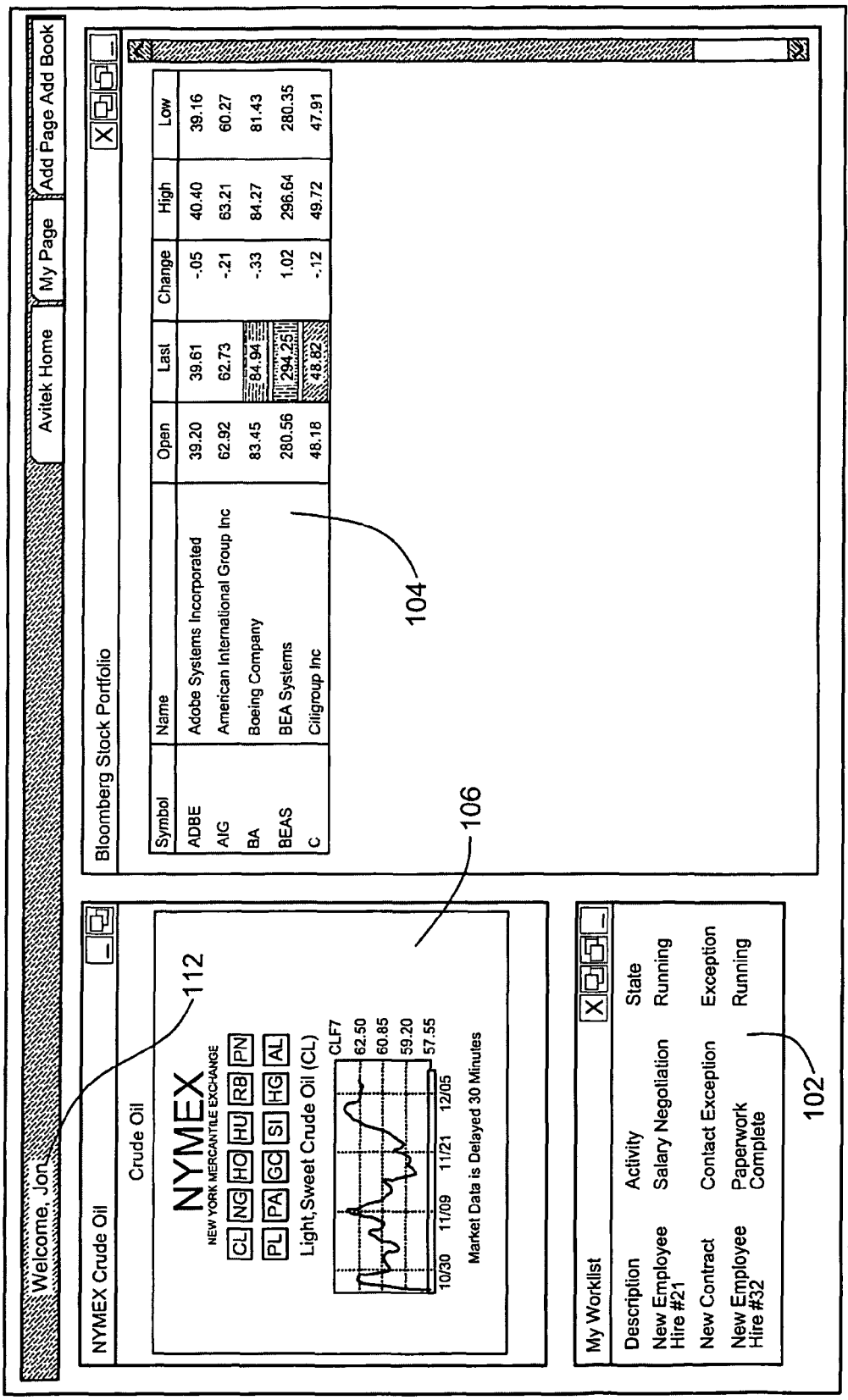
FIG. 1 is a schematic illustration of a dynamic web page.

Referring now to FIG. 1, showing an example of a dynamic web page. The page, generally referenced 100 is shown to a user who was identified by the system as an account owner 112. The page comprises three elements created dynamically by applications. The first element is stock table 104 comprising a lo row for each stock held by the person associated with the account. The second element is graph 106 showing the price of a particular stock over time, and the third element is a personalized work list 102 of the account owner. The page and each of the three components is created dynamically upon the user's request. In accordance with the disclosure, applications included in the web page will optionally provide a web crawler with a list of URIs for the application's internal pages. Then, when the web crawler will access such a page by following a URI, a service within the portal framework will intercept and parse the response from the page comprising the dynamic content, and will extract the indexable text out of the page. The page content parsing will be performed prior to returning the response to the web crawler. Then the extracted text will be returned to the web crawler for indexing.

Figure 2:
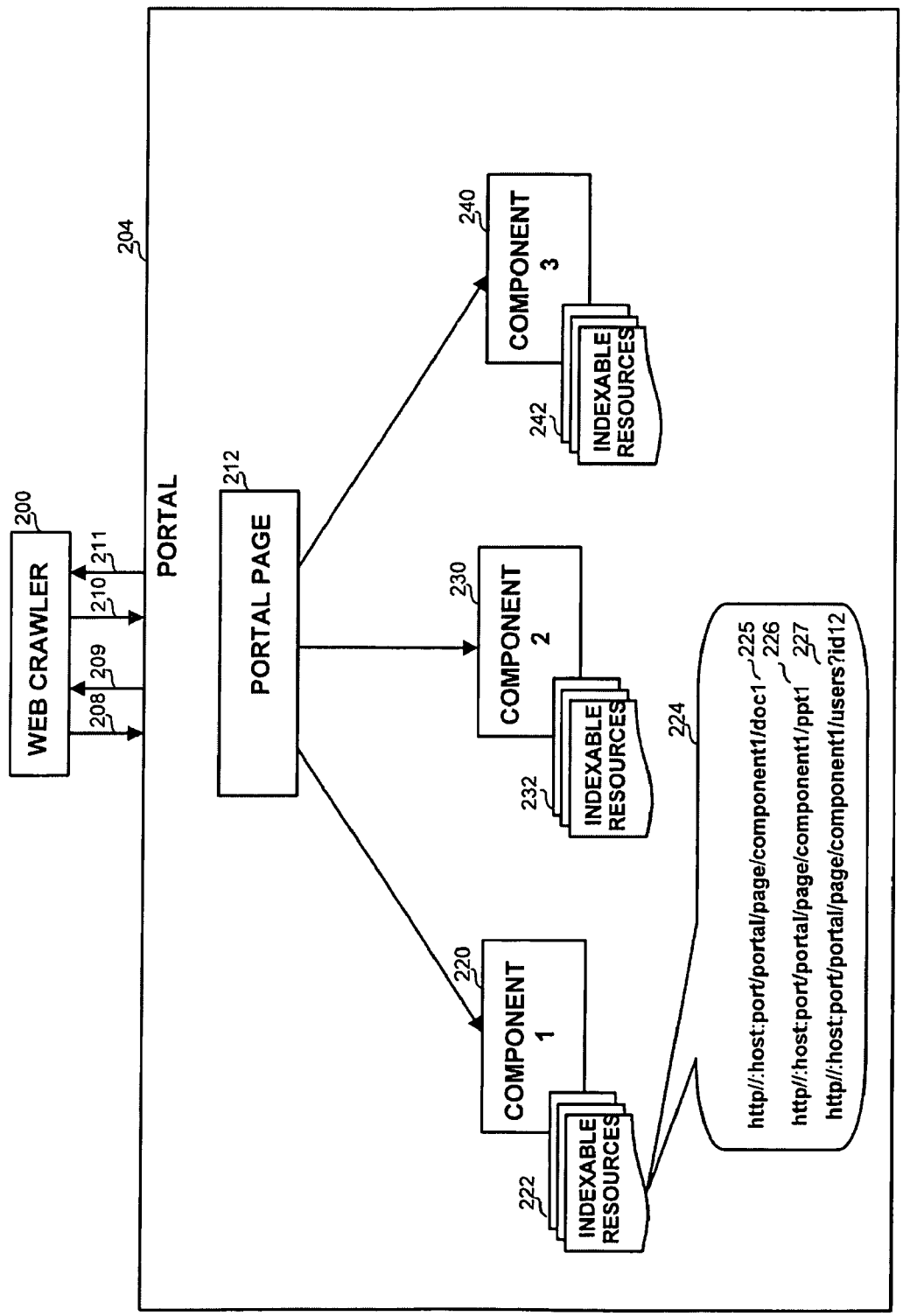
FIG. 2 is a schematic illustration of a typical environment in which the disclosure is used.

Referring now to FIG. 2, showing a schematic illustration of a typical environment in which the disclosure is used. The environment comprises a web crawler 200 or another application accessing a primary web page 212 or a primary application via a request 208 such as an HTTP request. Page 212 can be a portal page being a part of portal 204. It is assumed that crawler 200 is a legitimate application to which page 212 will want to expose information. Page 212 comprises a number of applications or components such as component 1 (220), component 2 (230), and component 3 (240), each showing a particular view on page 212. Each component uses one or more indexable resources, such as indexable resources 222 for component 1 (220), indexable resources 232 for component 2 (230), or indexable resources 242 for component 3 (240). Page 212 being a portal page wrapped by portal 204 is exemplary only, and is not required for implementing the disclosure. Rather, the disclosure can be applied to any application replacing page 212, with a wrapper infrastructure replacing portal 204.

Indexable resources 222 for component 1 (220) comprise, as a non-limiting example, URI 225 containing a text document, URI 226 containing a presentation document, and URI 227 comprising code that when activated will present a list of department members, which upon clicking or otherwise choosing any of them a page showing information related to the particular department member appears.

URIs 225, 226, 227 and the URIs appearing when entering URI 227 do not appear directly on page 212 but are rather the result of code within the application of component 1 (220). Therefore, the URIs and their contents are not accessible to crawler 200.

It will be appreciated by a person skilled in the art that page or application 212 may comprise one or more sets of interrelated computer instructions executed by a computing platform. Components 220, 230, 240 are also sets of interrelated computer instructions executed by the same or another computing platform, and resources such as resources 225, 226, 227 comprise content stored on a storage device accessible to the computing platform executing component 1 (220). Crawler 200 may comprise computer instructions and is executed by a computing platform. The computing platforms executing application 212, components 220, 230, 240 and crawler 200 can be the same computing platform or different ones. Each computing platform can be a personal computer, a mainframe computer, or any other type of computing platform provisioned with a memory device (not shown), a CPU or microprocessor device, and several I/O ports (not shown). Any of the computing platforms can alternatively be a mobile device, such as a Personal Digital Assistant (PDA), a smart phone, or a mobile device. The computing platforms, if more than one, are connected via a communication channel such as the Internet, Intranet, Local area Network (LAN), Wide Area Network (WAN), telephone network, voice over IP, wireless communication such as wireless LAN, or the like, employing commonly used protocols such as TCP, IP, IPTV or derivatives thereof or protocols that will be developed in the future. All sets of computer instructions can be implemented as software or firmware, in any programming language and under any programming environment.

Figure 3:
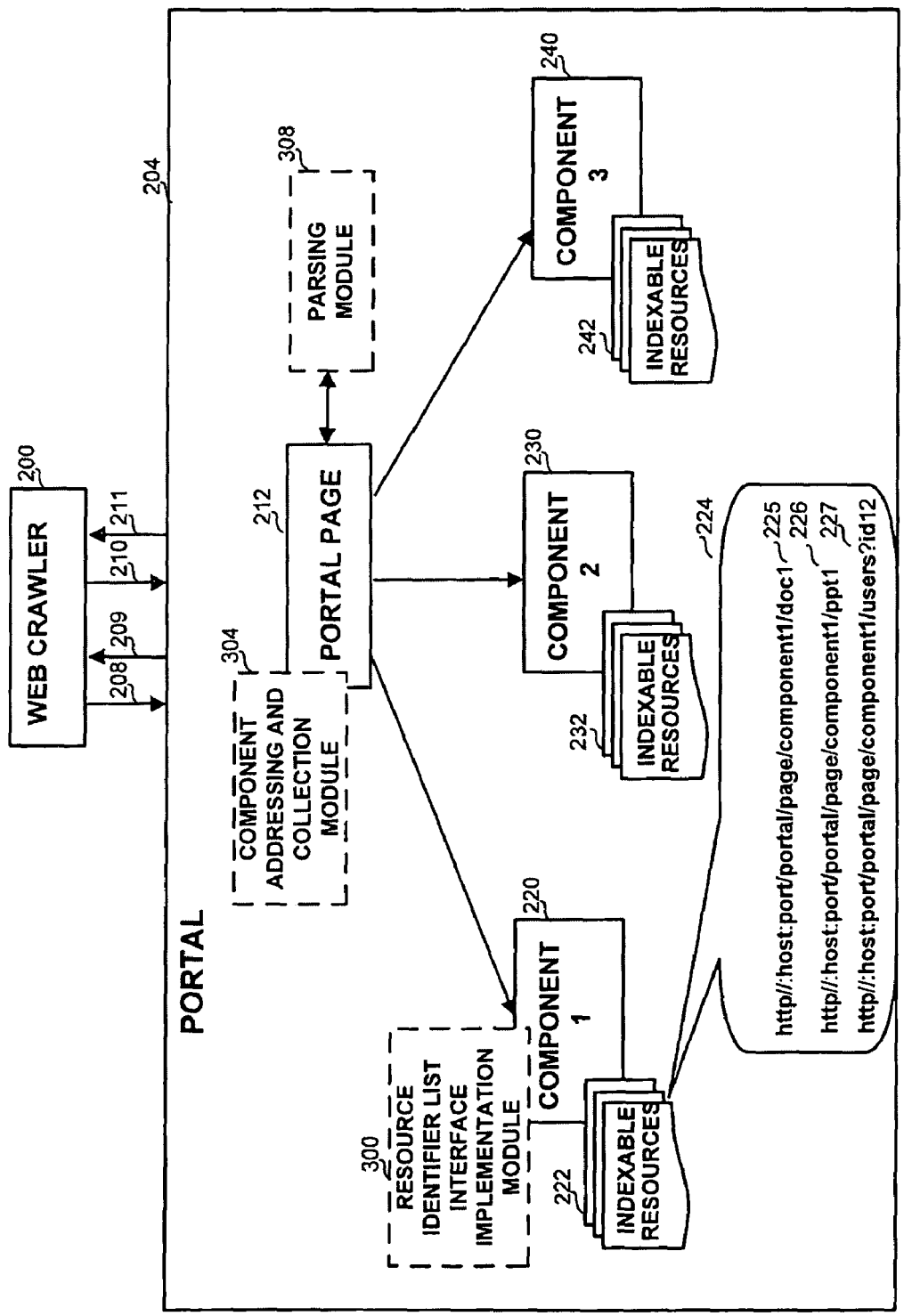
FIG. 3 is a schematic illustration of a typical environment employing one embodiment of the disclosed apparatus.

Referring now to FIG. 3, showing a schematic illustration of the same environment as FIG. 2, with additional modules providing an implementation of the disclosure. It is assumed that the designer or implementer of component 1 (220) will want to expose URI 225, URI 226, or URI 227 showing the members list, or one or more items from the list of the URIs each of which shows information related to a particular department member. The implementer of component 1 (220) will implement a resource list interface, such as resource list interface implementation module 300 which creates and returns a list or another collection of all URIs he or she wishes to expose, including some or all of URIs 225, 226, 227 and the URIs that when shown present the information for the particular department member.

It will be appreciated that each component designer, such as the designer of component 2 (230), the designer of component 3 (240) and the like, will also implement a module similar in essence to resource list interface implementation module 300, providing all URIs he or she wishes to expose for the particular component.

In addition, the implementer of portal 204 needs to implement a component-addressing and collection module 304. When the page is addressed by an external application such as crawler 200 with a request 208 for its content and additional links, the portal framework will activate addressing and collection module 304, and will address each component of the page, such as component 1 (220) and ask them for the collection of URIs accessible from the views created by these components. Addressing and collection module 304 will then concatenate or otherwise gather all URIs from all components. The URIs are then returned to crawler 200 via a response corresponding to request 208, e.g., if request 208 was an HTTP request then response 209 is an HTTP response.

At this stage all relevant URIs, including the dynamic ones are made available to crawler 200. However, the contents of these pages are also dynamic and thus can not be searched and indexed by crawler 200. Therefore a parsing module 308 is implemented as part of portal 204 or the infrastructure that wraps the accessed application.

Parsing module 308 is responsible for providing the content meaningful to the crawler out of the content of a dynamic web page. The web page content is optionally generated by JavaScript commands, or any other technology used within the relevant page.

When crawler 200 sends another request 210 to portal 204 or to the wrapper of application 212 to retrieve the contents of the web page, the relevant component within page or application 212, such as component 220 renders the request into a markup, which comprises JavaScript or other code, and optionally text or HTML parts. The rendering is performed as part of the logic of the relevant component, for example by a rendering component. Before the markup is transformed into a response, it is transferred to parsing module 308 which in several embodiments is a service that constructs a relevant data structure for the response, for example a Document Object Module (DOM) containing the result of parsing the HTML parts as well as interpreting and executing the JavaScript or other commands. In order to index dynamic pages comprising JavaScript code, parsing module 308 may comprise an HTML/JavaScript engine, for example an open source Java implementation thereof. The generated data structure contains substantially all text that appears within the page. The text is then extracted from the data structure using the standard tools associated with the data structure, such as the Application Program Interface (API) of DOM. If required for nested contents, the API or any other mechanism for accessing the data structure can be called recursively. The extracted text is concatenated or otherwise combined and returned to crawler 200 as response 211, in a format corresponding to request 210. It will be appreciated by a person skilled in the art that parsing module 308 provides some of the functionality of a browser presenting a page, but is activated on the server rather than on a client device.

It will be appreciated that resource list interface implementation module 300 is implemented as one or more collections of computer instructions being part of the relevant component such as component 220; component accessing and collection module 304 is implemented as collections of computer instructions being part of portal or application 204, and parsing module 308 is also implemented as computer instructions, being part of portal or wrapper 204. The computer instructions are arranged in executables, scripts, dynamic libraries, static libraries or any other components.

Figure 4:
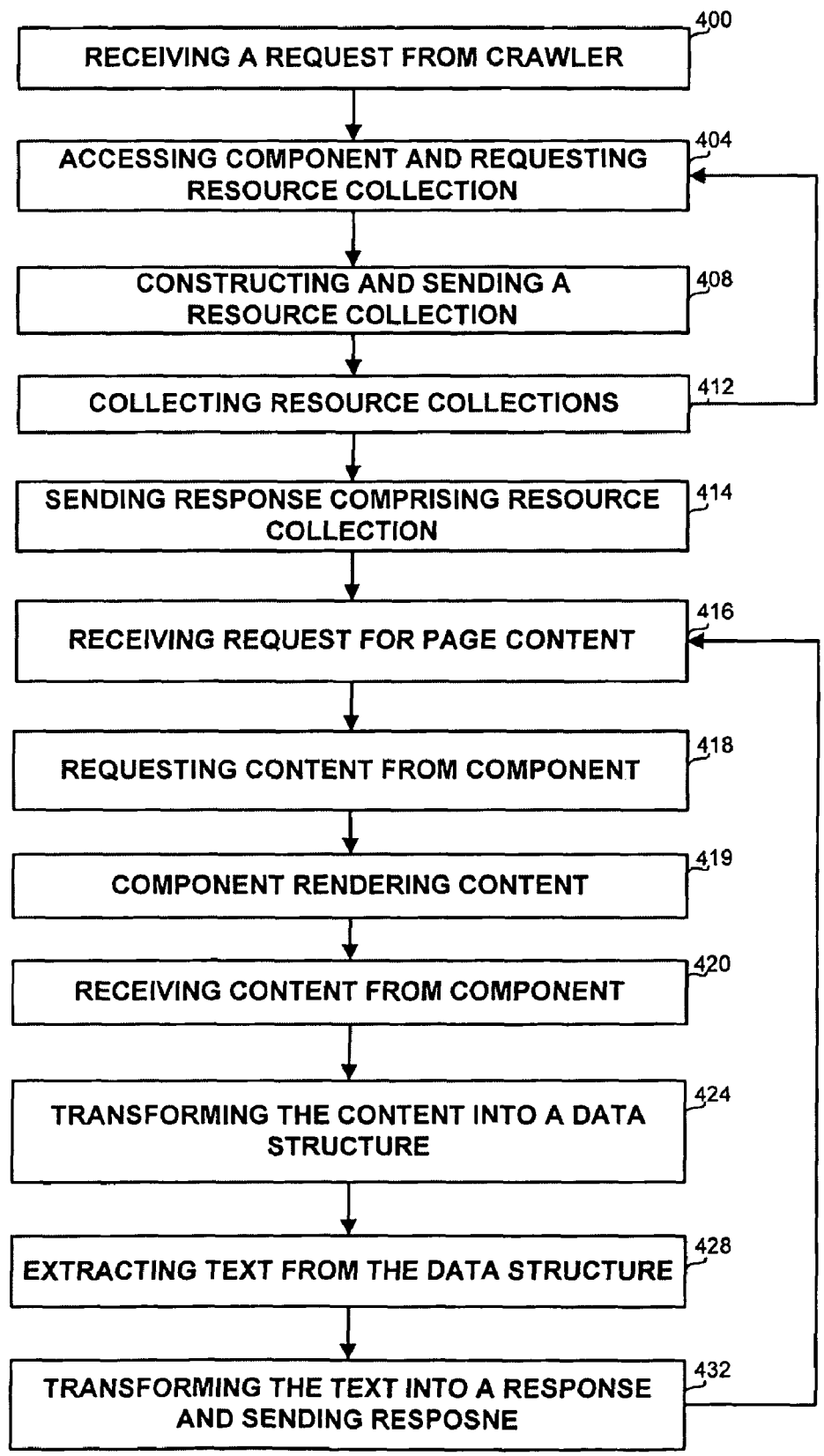
FIG. 4 is a flowchart of the main steps in one embodiment of a method of the disclosure.

Referring now to FIG. 4, showing a flowchart of the main steps in a method of the disclosure. On step 400 a request, such as but not limited to an HTTP request for a list of pages is received by a web page or an application, from an entity such as a crawler. On step 404, the web page or application sends to every component which produces a part of the page or the application a request for a collection of its resources. On step 408 the component constructs the requested resource collection and sends it back to the application or web page. On step 412 the web page collects the resource collection sent from the respective component. Steps 404, 408, and 412 are repeated for every component of the web page or application. On step 414 the collection of all resource collections is sent back to the entity that sent the request on step 400, such as a crawler. Since the pages are generally not reachable from one another but are rather a flat list as provided by the designer or the programmer, the response is also flat, i.e. not presenting hierarchical relations among the pages.

On step 416 a request is received from the crawler or another entity for the contents of a page from the list, wherein the content may be dynamic. The crawler traverses the received collection of URIs and requests the content of each of them for indexing or other purposes. On step 418 the request is sent by the web page or application to the respective component. On step 419 the component renders the content according to its internal logic, and on step 420 the web page receives the contents from the respective component, optionally including code instructions and not just HTML or text. On step 424 a parsing module transforms the response into a data structure such as a DOM, and on step 428 text is extracted from the structure, for example by using corresponding tools such as the API of DOM objects. On step 432 the text is transformed into a response to the request received on step 416 and is sent to the crawler or to the entity that sent the request. Step 416, 418, 420, 424, 428 and 432 are repeated for every resource for which as request is sent by the crawler or the other entity.

The embodiments detailed above provide a method and apparatus for enabling a web crawler or another program to access and index the contents of web pages associated with a portal, whose addresses, contents, or both are generated dynamically by applications comprised in a web page or an application. Each such application is enhanced with a module that supplies, according to its designer's choice all dynamic addresses accessible from the application, and all collections of the dynamic addresses are sent back to the crawler.

Then, when the crawler addresses the portal again requesting for the content of a dynamic web page, the application associated with the address generated the content, and the content is then transformed by a parsing module associated with the portal into a data structure. The data structure is then queried and its text or HTML extracted. The response is then sent back to the web crawler for indexing.

It will be appreciated by a person skilled in the art that the disclosed method and apparatus can be used in other contexts of the primary application such as a portal, and not only as response to crawling activities by a crawler or another external application. It will be further appreciated that multiple variations and options can be designed along the guidelines of the disclosed method. For example, if pages are expected which provide code in a particular programming or scripting language, such as JavaScript, a relevant parsing component should be made a part of, or accessed by the parsing module. The relevant parsing components can be used and manipulated by configuration settings and implemented as plug-ins so that no further programming or compilation are required when an additional language is used in web pages.

It will also be appreciated that the text string is optionally sent to the crawler instead of the originally rendered page or, alternatively, the text string can be wrapped into an automatically generated HTML file which is returned to the crawler. The HTML file, can contain in addition to the text, also a single HTML link with the identifier of the next resource identifier, i.e. the next page in the list lo returned by the component. This mechanism can be used for causing the crawler to process all the identifiers in the list provided by one component before continuing to the identifiers of the next component.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method, to be executed on one of more computing platforms each having a memory and a microprocessor, for providing to a first application communicating with a primary application, the text or Hypertext Markup Language code content of a dynamic web page, the dynamic web page created by a component associated with the primary application, the method comprising the steps of:

enhancing the primary application with a collection module and the component with an interface module;

the collection module of the primary application sending to the interface module of the component a request for a collection of resources; and the interface module of the component providing to the collection module of the primary application a resource list with the collection of resource identifiers comprising resource identifier associated with dynamic web pages that the component wishes to expose.

2. The method of claim 1 further comprising the steps of:
the primary application requesting the content associated with the resource identifier from the component;
the component rendering the content; and
a parsing module associated with the primary application extracting text or Hypertext Markup Language code from the content.

3. The method of claim 2 further comprising the steps of:
the primary application receiving from the first application a request for content associated with a resource from the resource list, the resource associated with the dynamic web page; and the primary application sending to the first application the text or Hypertext Markup Language code.

4. The method of claim 2 wherein extracting the text or Hypertext Markup Language code comprises the steps of: transforming the content into a data structure; and extracting the text or Hypertext Markup Language code from the data structure.

5. The method of claim 4 wherein the data structure is a Document Object Model object.

6. The method of claim 1 wherein the primary application is a portal page.

7. The method of claim 1 further comprising the steps of: the primary application receiving from the first application a request for the collection of resources; and the primary application sending to the first application the collection of resources.

8. The method of claim 1 wherein the first application is a web crawler.

9. The method of claim 1 wherein the dynamic web page comprises JavaScript code.

10. A non-transitory computer readable storage medium containing a set of instructions for executing the method of claim 1.

11. An apparatus for providing to a first application communicating with the apparatus text or Hypertext Markup Language code content of a dynamic web page, the apparatus comprising:

a primary application executed on a computing platform having a memory and a microprocessor and accessible by the first application, the primary application comprising or in communication with: at least one component, the at least one component comprising a resource list interface implementation module implementing an interface for providing an at least one resource identifier that the component wishes to expose;

a component-addressing and collection module executed by the primary application for addressing the at least one component and collecting the at least one resource identifier provided by the least one component; and a parsing module for extracting text or Hypertext Markup Language code from content of the dynamic web page as received from the component in response to sending the at least one resource identifier.

12. The apparatus of claim 11 wherein the first application is a web crawler.

13. The apparatus of claim 11 wherein the primary application is a portal page.

14. The apparatus of claim 11 wherein the dynamic web page comprises JavaScript code.

15. The apparatus of claim 11 wherein the parsing module transforms the content of the dynamic web page as received from the component into a data structure and extracts the text or Hypertext Markup Language code from the data structure.

16. The apparatus of claim 15 wherein the data structure is a Document Object Model object.

17. A non-transitory computer readable storage medium containing a set of instructions for executing an application with modules according to claim 11.

* * * * *